Jan. 9, 1968  W. ELDER, JR  3,362,447
DOWEL HOLE DRILLING DEVICE
Filed April 22, 1965
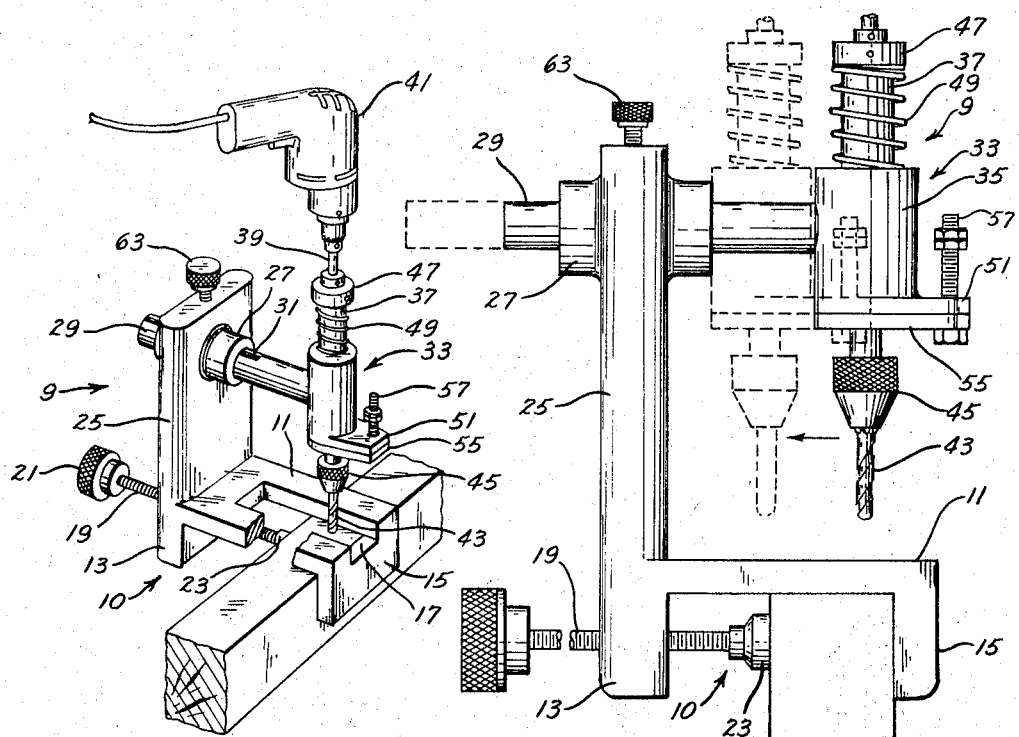
Fig. 1
Fig. 2
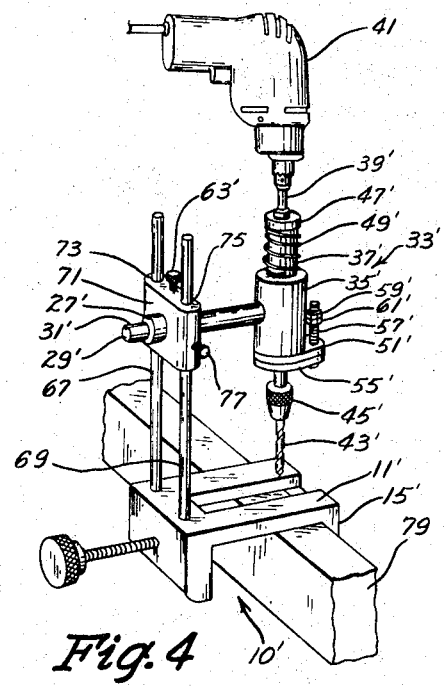
Fig. 4
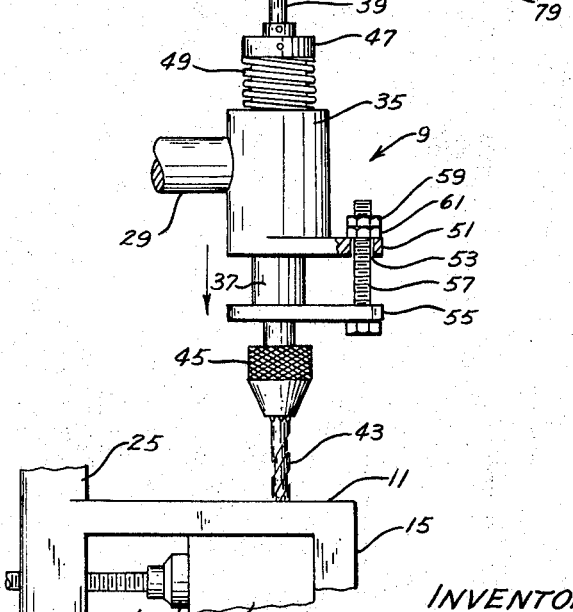
Fig. 3
INVENTOR
WALTER ELDER, JR.
BY
ATTORNEYS 3,362,447
DOWEL HOLE DRILLING DEVICE
Walter Elder, Jr., 520 10th St., West Des Moines,
Iowa 50309
Filed Apr. 22, 1965, Ser. No. 449,935
1 Claim. (Cl. 144—104)

ABSTRACT OF THE DISCLOSURE

A dowel hole drilling device including a clamp means for maintaining the member to be drilled therebetween and a support means extending upwardly therefrom which has a bearing means operative secured thereto. The bearing means is vertically and horizontally movable with respect to the clamp means and is adapted to have a bit means operatively secured at the lower end thereof and a drill operatively secured at the upper end thereof.

---

This is a continuation-in-part application of the application, Ser. No. 318,242 having a filing date of Oct. 23, 1963 now abandoned.

Dowels and dowel holes are used extensively in the furniture and woodworking fields. It is difficult to obtain uniform alignment and uniform depth when drilling dowel holes. In addition, it is hard to obtain perfectly perpendicular holes with respect to the object being drilled.

Therefore, a principal object of this invention is to provide a means to drill properly aligned dowel holes.

A further object of this invention is to provide a means whereby dowel holes may be drilled to uniform depths.

A further object of this invention is to provide a means which can be adapted to drill various sized boards.

A further object of this invention is to provide a means whereby objects to be drilled will be securely held in place with respect to the dowel hole drilling device.

A further object of this invention is to provide a dowel hole drilling device which permits vertical as well as horizontal adjustment of the drill bit with respect to the workpiece.

A further object of this invention is to provide a dowel hole drilling device that is economical of manufacture, durable in use and refined in appearance.

These and other objects of the invention will be apparent from the following description taken in conjunction with the accompanying drawing, wherein:

FIG. 1 is a perspective view of the device in operation;

FIG. 2 is a side elevational view of the device with broken lines indicating the adjustability of the device;

FIG. 3 is a fragmentary side elevational view of the device; and

FIG. 4 is a perspective view of a modified version of the device.

With respect to FIGS. 1-3, the numeral 9 designates one form of the invention wherein the numeral 10 generally designates a clamping means having an upper portion 11 and vertical jaws 13 and 15 extending downwardly from the opposite ends thereof. It can be seen from the drawings that upper portion 11 is provided with a cut-away portion 17. A threaded tightening screw 19 threadably extends through jaw 11 and has a handle 21 on its outer end. The inner end of screw 19 is provided with a clamping plate 23.

Extending upwardly from one end of upper portion 11 is a support means 25 having a hollow arm guide means 27 mounted in its upper end. An arm member 29 is horizontally slidably mounted in guide means 27 and is provided with a groove 31 formed along its upper end for a portion of its length. Secured to one end of arm member 29 is a vertical bearing means 33. Vertical bearing means 33 includes a hollow cylindrical outer member 35 having a drive shaft guide means 37 vertically slidably extending therethrough. A drive shaft 39 is rotatably mounted in guide means 37 and has its upper end adapted to be received by a chuck of a drill 41. The lower end of drive shaft 39 is adapted to have a drill bit 43 secured thereto by any convenient means. The drawings illustrate one means for securing the drill bit to the drive shaft wherein a chuck 45 has its upper end secured to the lower end of drive shaft 39 and its lower end secured to a drill bit 43.

A collar 47 detachably embraces the upper end of guide means 37 as best seen in FIG. 2. A spring means 49 embraces guide means 37 between collar 47 and the upper end of outer member 35 to bias guide means 37 and drive shaft 39 upwardly.

The lower end of outer member 35 has a plate member 51 secured thereto which extends outwardly therefrom and which is provided with an opening 53 formed therein. A plate member 55 is secured to the lower end of guide means 37 by any convenient means and also extends outwardly therefrom. Threadably received by plate 55 is a bolt 57 extending upwardly therefrom. Bolt 57 extends through opening 53 and has a pair of nuts 59 and 61 mounted thereon to limit the downward movement of plate 55, guide means 37 and drive shaft 39 with respect to vertical bearing means 33.

A screw means 63 threadably extends downwardly into support means 25 from the upper end thereof and is adapted to be received by groove 31 to prevent hoizontal movement of arm member 29 at times.

The modified form of the device seen in FIG. 4 is substantially identical to the device seen in FIGS. 1-3. Therefore, only the structure of FIG. 4 which is diffierent from FIG. 3 will be described with (′) indicating identical structure.

The modified form of the device is generally designated by the numeral 65. As seen in FIG. 4, a pair of vertically disposed rods 67 and 69 are secured to clamping means 10′ by any convenient means and extend upwardly therefrom. A support means 71 having bores 73 and 75 formed therein slidably embraces rods 67 and 69. A screw 77 threadably extends inwardly into support means 71 from one side thereof and engages rod 69 to maintain support means 71 in various positions of its vertical movement with respect to rods 67 and 69. Support means 71 includes a hollow guide means 27′ mounted therein which is adapted to slidably receive arm member 29′. A screw 63′ threadably extends downwardly into support means 71 from the upper end thereof and is adapted to be received by groove 31′ to prevent horizontal movement of arm member 29′ with respect to support means 71 at times. The numeral 79 generally designates a workpiece.

With respect to the device seen in FIGS. 1-3, the usual method of operation is as follows. A workpiece 79 is placed between jaws 13 and 15. Tightening screw 19 is then turned until clamping plate 23 rigidly engages workpiece 79. A drill bit of the desired diameter is inserted into chuck 45 and secured therein. After determining how deep a dowel hole is desired to be drilled in workpiece 79, nuts 59 and 61 are threadably moved upwardly or downwardly on bolt 57. It can be seen that the lower-most nut will engage the upper surface of plate member 51 to limit the penetration of the drill bit. The drill bit may be moved laterally with respect to the workpiece by simply loosening screw 63 and horizontally slidably moving arm member 29. When the drill bit is located in its desired position, it is simply necessary to tighten screw 63. An electric drill 41 is attached to the upper end of drive shaft 39 in conventional fashion. Electric drill 41 is then turned on and the drill bit is caused to penetrate the workpiece 79 by simply exerting downward pressure on the drill 41. When the hole has been drilled, the downward pressure on the drill 41 is released and spring means 49 will cause the drill bit to be withdrawn from the hole in the workpiece.

With respect to the modified form of the device seen in FIG. 4, it can be appreciated that a vertical adjustability of support means 73 is also provided to make the device somewhat more versatile so that a variety of different bit lengths may be used. This vertical adjustability permits the device to drill deeper holes than the device described in FIGS. 1–3 as well as providing a more accurate means for positioning the drill bit exactly over the spot to be drilled without the necessity of exerting downward pressure on the drill 41.

It should also be noted that shaft 39 could be connected to a conventional drill press if so desired.

Thus from the foregoing it can be seen that the device accomplishes at least all of its stated objectives.

Some changes may be made in the construction and arrangement of my dowel hole drilling device without departing from the real spirit and purpose of my invention, and it is my intention to cover by my claim, any modified forms of structure or use of mechanical equivalents which may be reasonably included within their scope.

I claim:
1. In a dowel hole drilling device,
   a clamp means comprised of an upper portion and a pair of vertically disposed jaws extending downwardly therefrom and a tightening means on at least one of said jaws adapted to maintain a supporting member between said jaws at times,
   a support means on said upper portion and extending upwardly therefrom,
   an arm member selectively horizontally slidably mounted in said support means adjacent the upper end thereof,
   and a vertical bearing means operatively secured to one end of said arm member,
   said bearing means including a hollow cylindrical outer member having a drive shaft guide means vertically slidably mounted therein and extending therethrough, a rotatable drive shaft embraced by said drive shaft guide means and extending therethrough, said drive shaft adapted to be operatively secured at its upper end to a drill means and to a drill bit at its lower end,
   a first plate member secured to the lower end of said outer member and extending outwardly therefrom,
   a second plate member secured to the lower end of said drive shaft guide means and extending outwardly therefrom,
   and a bolt means secured at one of its ends to the outwardly extending portions, one of said first and second plate members and extending through the outwardly extending portions of the other of said first and second plate members, said bolt means having a nut threadably mounted thereon to adjustably limit the downward vertical movement of said drive shaft guide means with respect to said outer member.

References Cited
UNITED STATES PATENTS

| | | | |
|---|---|---|---|
| 20,469 | 6/1858 | Daggertt | 77—13 |
| 596,375 | 12/1897 | Murchie | 77—13 |
| 1,528,536 | 3/1925 | De Walt | 143—6 |
| 2,160,274 | 5/1939 | Lopez | 77—62 X |

FOREIGN PATENTS

| | | |
|---|---|---|
| 19,640 | 1/1900 | Switzerland. |

DONALD R. SCHRAN, *Primary Examiner.*